(No Model.)
B. F. BRIDGES.
SAW SWAGING DEVICE.
No. 297,559. Patented Apr. 29, 1884.
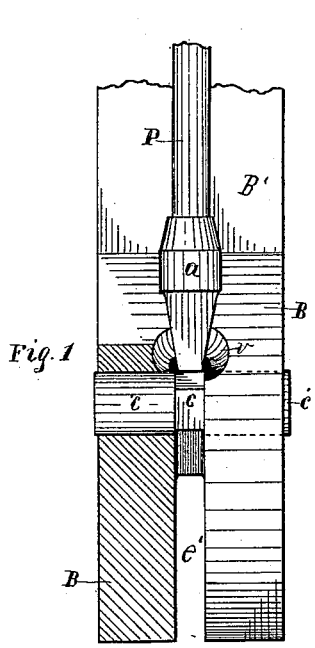
Fig. 1
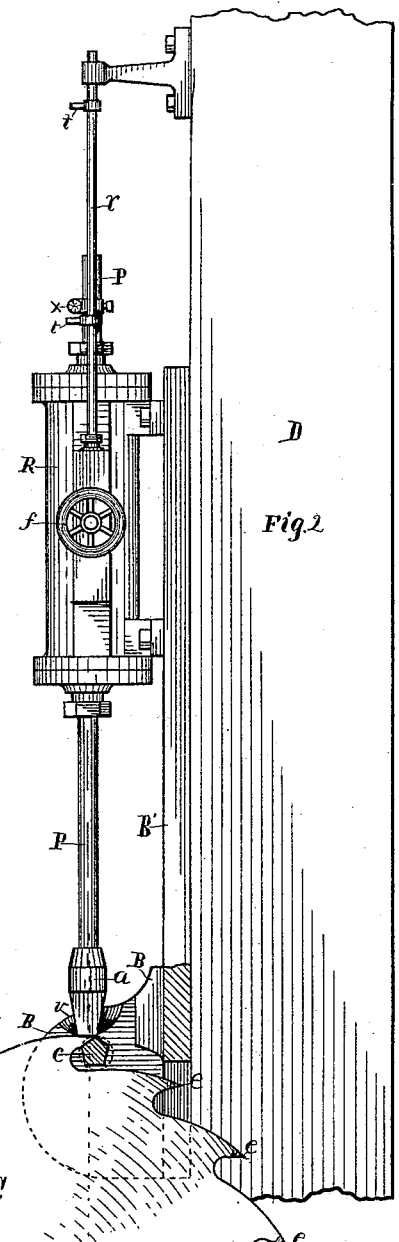
Fig. 2
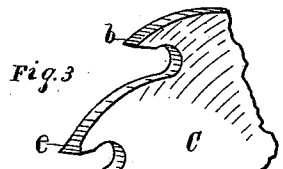
Fig. 3
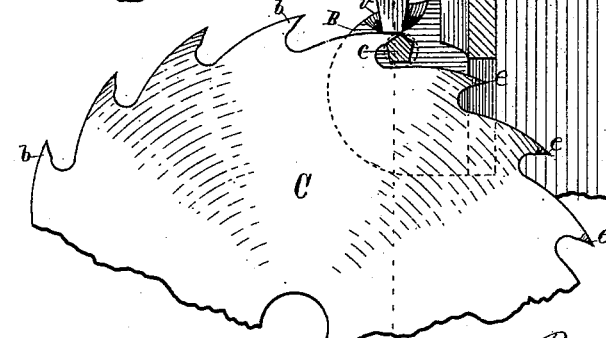
Attest.
Jno. C. Perkins
J. L. West
Inventor.
Benj. F. Bridges
Per Lucius C. West
Atty.

UNITED STATES PATENT OFFICE.

BENJAMIN F. BRIDGES, OF BIG RAPIDS, MICHIGAN.

SAW-SWAGING DEVICE.

SPECIFICATION forming part of Letters Patent No. 297,559, dated April 29, 1884.

Application filed August 17, 1883. (No model.)

*To all whom it may concern:*

Be it known that I, BENJ. F. BRIDGES, a citizen of the United States, residing at Big Rapids, county of Mecosta, State of Michigan, have invented a new and useful Steam Saw-Swage, of which the following is a specification.

The object of my invention is to construct a suitable device whereby saws may be swaged by steam-power.

In the drawings forming a part of this specification, Figure 1 is a front or face view of the die-support, partly in section; Fig. 2, a side elevation, partly in section, showing the device in operation; and Fig. 3, a broken portion of the saw.

D represents a vertical timber or wall of a mill, to which the device is secured.

To the die-support B' the cylinder R is secured. The die-support has an extension, B, at the lower end, through which the die $c'$ is revolubly located. The center of the die $c'$ is provided with surfaces at $c$, suitable for the saw-teeth to rest upon while being swaged by the hammer $a$, terminating the end of the piston P.

$e'$ is a recess in the extension B of the die-support to receive the saw C, Fig. 2. The die $c'$, being revolubly located in the die-support, will turn or yield in accordance with the contour or angle of the tooth operated upon, thus obviating a danger of breaking or bending said tooth. The surfaces of the die at $c$ may be flat or oval to suit. I usually make them a little oval or rounding, to correspond to the curve of the edge of tooth in the style of saw used by me. Any arrangement of throttle-valves and levers may be used with the engine to enable the operator to accurately and conveniently control the stroke of the hammer, both as regards speed and force.

The position of the saw in its relation to the device when the tooth-point is struck by the hammer is clearly shown in Fig. 2.

In Fig. 3, $b$ shows a tooth before the operation, and $e$ shows a tooth after it has been swaged by the hammer $a$.

In Fig. 1 a section is shown removed from the extension B, showing the round bearings of the die $c'$.

In Fig. 2 half of the extension B is removed, showing the position of the saw C in the recess $e'$, as before explained.

Having thus described my invention, what I claim as new is—

The combination, with the die-support having the integral recessed extension, of the engine, swaging-hammer, and a die adapted for the swaging of a saw-tooth, all said parts constructed and associated in substantially the combination shown and described.

In testimony of the foregoing I have hereunto subscribed my name in the presence of two witnesses.

BENJAMIN F. BRIDGES.

Witnesses:
JOHN B. UPTON,
ALONZO B. SUMNER.